US012387599B2

United States Patent
Amogh et al.

(10) Patent No.: US 12,387,599 B2
(45) Date of Patent: Aug. 12, 2025

(54) DYNAMIC INFORMATION OBTAINING METHOD AND RELATED DEVICE

(71) Applicant: HUAWEI TECHNOLOGIES CO., LTD., GuangDong (CN)

(72) Inventors: Niranth Amogh, Bangalore (IN); Cuili Ge, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 18/173,954

(22) Filed: Feb. 24, 2023

(65) Prior Publication Data

US 2023/0206760 A1 Jun. 29, 2023

Related U.S. Application Data

(63) Continuation of application No. PCT/CN2020/111159, filed on Aug. 25, 2020.

(51) Int. Cl.
*G08G 1/0967* (2006.01)
*H04L 67/12* (2022.01)

(52) U.S. Cl.
CPC . *G08G 1/096775* (2013.01); *G08G 1/096708* (2013.01); *H04L 67/12* (2013.01)

(58) Field of Classification Search
CPC ....... G08G 1/096775; G08G 1/096708; G08G 1/0141; G08G 1/096791; G08G 1/165; G08G 1/166; H04L 67/12
USPC .......................................................... 701/24
See application file for complete search history.

(56) References Cited

U.S. PATENT DOCUMENTS

| | | | |
|---|---|---|---|
| 2017/0010618 A1* | 1/2017 | Shashua | G01C 21/1656 |
| 2019/0323855 A1* | 10/2019 | Mahler | G01S 17/89 |
| 2020/0005644 A1* | 1/2020 | Ichimaru | G08G 1/096775 |

(Continued)

FOREIGN PATENT DOCUMENTS

| | | |
|---|---|---|
| CN | 110419070 A | 11/2019 |
| CN | 110648548 A | 1/2020 |
| CN | 110710264 A | 1/2020 |

(Continued)

OTHER PUBLICATIONS

3GPP TS 23.286 V17.4.0, "3rd Generation Partnership Project; Technical Specification Group Services and System Aspects; Application layer support for Vehicle-to-Everything (V2X) services; Functional architecture and information lows; (Release 17)", Jun. 2020; 106 total pages.

(Continued)

*Primary Examiner* — Anshul Sood
(74) *Attorney, Agent, or Firm* — Rimon PC

(57) ABSTRACT

Embodiments of this application disclose a dynamic information obtaining method and a related device thereof, and can be applied to the field of artificial intelligence. In the method, a first enabler server obtains information about an enabler client in a target area of a target client. Also in the method, the first enabler server sends a first message to the enabler client, where the first message is used for the enabler client to report first information. The first information includes local dynamic information of the enabler client, and the first information is used for obtaining dynamic information associated with the target client.

18 Claims, 8 Drawing Sheets

(56) References Cited

U.S. PATENT DOCUMENTS

2020/0201330 A1   6/2020   Shashua et al.
2021/0293562 A1*  9/2021   Bang .................. B60W 60/001

FOREIGN PATENT DOCUMENTS

| CN | 110930747 A | 3/2020 |
| CN | 111460865 A | 7/2020 |
| WO | 2020111133 A1 | 6/2020 |

OTHER PUBLICATIONS

3GPP TS 23.434 V16.4.0 "3rd Generation Partnership Project; Technical Specification Group Services and System Aspects; Service Enabler Architecture Layer for Verticals (SEAL); Functional architecture and information flows; (Release 16)," Jul. 2020; 120 total pages.

3GPP TSG-SA WG6 Meeting #38-e, S6-201157, "New key issue on supporting dynamic information for HD maps," Huawei, Hisilicon, e-meeting, Jul. 20-31, 2020; 2 total pages.

* cited by examiner

DYNAMIC INFORMATION OBTAINING METHOD AND RELATED DEVICE

CROSS-REFERENCE TO RELATED APPLICATIONS

This application is a continuation of International Application No. PCT/CN2020/111159, filed on Aug. 25, 2020, the disclosure of which is hereby incorporated by reference in its entirety.

TECHNICAL FIELD

Embodiments of this application generally relate to the field of artificial intelligence technologies, and in particular, to a dynamic information obtaining method and a related device.

BACKGROUND

Autonomous driving is a mainstream application in the field of artificial intelligence technologies. Autonomous driving technology relies on collaboration of computer vision, radar, a monitoring apparatus, a global positioning system, and the like, so that a motor vehicle can complete autonomous driving within a predetermined trip without direct human interactions. Specifically, an autonomous driving process may include: a system learns of a traffic condition around an autonomous driving vehicle by using a detection device such as a video camera, a radar sensor, or a laser rangefinder on the vehicle. The traffic condition includes information such as an obstacle, a traffic indicator, and a moving pedestrian that is obtained by the detection device. Then, the system draws a high-definition map based on the information, to provide a driving environment reference for the autonomous driving vehicle and implements navigation of the autonomous driving vehicle.

Specifically, the autonomous driving vehicle may include a main control computer. A target client on the main control computer receives detection information sent by each detection device, and processes and analyzes the information, to obtain a high-definition map of a road ahead. The target client plans a driving route of the vehicle based on the high-definition map and controls a running track of the vehicle. For example, the target client may further interact with a network side and send the detection information to a service server. The service server obtains, based on information provided by the target client, a high-definition map corresponding to the target client, and then the target client guides driving of the vehicle based on the high-definition map.

Due to a limitation of performance of the detection device, the detection information sent by the detection device and received by the target client is limited, and a range of the high-definition map obtained based on the information provided by the target client is usually fixed and limited. However, in some scenarios, for example, in a high-speed driving state, to avoid impact of a road emergency on autonomous driving, the autonomous driving vehicle usually needs to learn of a high-definition map of a larger range, to plan a driving solution of the vehicle in advance and ensure safety of the autonomous driving. How to obtain a high-definition map corresponding to an appropriate geographical range for reference by the autonomous driving vehicle is a problem that urgently needs to be resolved.

SUMMARY

Embodiments of this application provide a dynamic information obtaining method and a related device thereof, to obtain high-definition map information in a corresponding target area of a target client, so that the target client can obtain a high-definition map in a proper range based on a requirement of the target client.

A first aspect of embodiments of this application provides a dynamic information obtaining method. The method includes the following steps.

A first enabler server obtains information about an enabler client in a target area of the target client, and then sends a first message to the enabler client to indicate the enabler client to report first information. Then, the first message may be used to obtain dynamic information associated with the target client. The first information refers to local dynamic information of the enabler client, and reflects a surrounding environment learned by the enabler client. Dynamic information of a high-definition map dynamic layer of the target client and high-definition map information of the target client may be obtained by using the reported local dynamic information.

The first enabler server may indicate the enabler client in the target area of the target client to report the local dynamic information of the enabler client. In this way, a high-definition map can be obtained based on local dynamic information collected by a plurality of enabler clients in the target area, and can completely reflect a traffic environment of the target area. In this way, the high-definition map is used as a reference for the target client to determine a driving action, so that the target client can obtain traffic information of a large range and plan a more proper driving solution.

With reference to the first aspect of embodiments of this application, in a first implementation of the first aspect of embodiments of this application:

The dynamic information associated with the target client includes first dynamic information or second dynamic information, the first dynamic information is the dynamic information of the high-definition map dynamic layer of the target client, and the second dynamic information is the high-definition map information of the target client.

With reference to the first aspect and the first implementation of the first aspect of embodiments of this application, in a second implementation of the first aspect of embodiments of this application:

The first enabler server may receive information about the target area sent by a service server. In other words, the service server determines the target area of the target client, and the first enabler server may directly determine the target area based on the information sent by the service server.

The service server determines the target area, and the first enabler server directly obtains the information about the enabler client in the target area based on the determined target area. In this way, a workload of the first enabler server can be reduced, and working performance of the first enabler server can be improved.

With reference to the first aspect and the first implementation of the first aspect of embodiments of this application, in a third implementation of the first aspect of embodiments of this application:

The first enabler server may further obtain an identifier of the target client and range information of the target client from a service server. Then, the first enabler server tracks a geographical location of the target client based on the identifier of the target client, and determines the target area around the target client based on the range information.

In some implementations, the service server determines the range information of the target client, and then the first enabler server tracks the geographical location of the target client and determines the target area of the target client. This provides another solution for determining the target area of the target client.

With reference to the first aspect and the first implementation of the first aspect of embodiments of this application, in a fourth implementation of the first aspect of embodiments of this application:

The first enabler server may further obtain an identifier of the target client and auxiliary information of the target client from a service server. The auxiliary information may reflect a driving requirement of the target client. Then, the first enabler server determines range information of the target client based on the auxiliary information, tracks a geographical location of the target client by using the identifier of the target client, and determines the target area around the target client based on the determined range information.

In some implementations, the first enabler server determines the range information of the target client and then determines the target area around the target client based on the range information. This provides another solution for determining the target area of the target client.

With reference to the fourth implementation of the first aspect of embodiments of this application, in a fifth implementation of the first aspect of embodiments of this application:

The auxiliary information may be one or more of a type of a service that the target client participates in, a sensor measurement range corresponding to the target client, capability information of a terminal device corresponding to the target client, a speed of the target client, a direction of the target client, and a planned path of the target client. All these may directly or indirectly reflect a requirement of the target client for the high-definition map. A proper target area may be determined by using the information, to provide the high-definition map in a more proper range for the target client.

With reference to the first aspect to the fifth implementation of the first aspect of embodiments of this application, in a sixth implementation of the first aspect of embodiments of this application:

The first enabler server may further receive an update policy. The update policy is a dynamic information update requirement. The first enabler server may request, according to the update policy, the enabler client to report the first information. In this way, the dynamic information may be provided for the target client according to the update policy to ensure a service requirement of the target client.

With reference to the first aspect to the sixth implementation of the first aspect of embodiments of this application, in a seventh implementation of the first aspect of embodiments of this application:

After determining the target area of the target client, the first enabler server may send a first request message to a location management server to request the location management server to determine the enabler client in the target area and then send the information about the enabler client to the first enabler server.

The first enabler server sends the first request message that carries target area information to the location management server, so that the location management server determines the enabler client in the target area and sends the information about the enabler client to the first enabler server. This provides a feasible solution for the first enabler server to determine the enabler client.

With reference to the first aspect to the sixth implementation of the first aspect of embodiments of this application, in an eighth implementation of the first aspect of embodiments of this application:

The first enabler server may further obtain the information about the enabler client in the target area from another enabler server. In other words, the another enabler server provides the information about the enabler client in the target area. This provides a feasible solution for the first enabler server to determine the enabler client.

With reference to the first aspect to the eighth implementation of the first aspect of embodiments of this application, in a ninth implementation of the first aspect of embodiments of this application:

When the first enabler server sends the first message to the enabler client to request the enabler client to report the first information, the first enabler server may further include a reporting policy in the first message, so that the enabler client performs reporting according to the reporting policy. Specifically, the reporting policy may be obtained through the update policy.

Because the first information is used to obtain the high-definition map information, the enabler client reports the first information according to an update policy of the high-definition map, to ensure normal update of the high-definition map.

With reference to the first aspect to the ninth implementation of the first aspect of embodiments of this application, in a tenth implementation of the first aspect of embodiments of this application:

When the enabler client reports the first information, the enabler client may report the first information to the enabler server, and the enabler server aggregates a plurality of pieces of the first information, so that the plurality of pieces of the first information are used to obtain the dynamic information that is sent to the target client.

With reference to the tenth implementation of the first aspect of embodiments of this application, in an eleventh implementation of the first aspect of embodiments of this application:

The enabler server may send the dynamic information to the target client through the service server.

With reference to the first aspect to the ninth implementation of the first aspect of embodiments of this application, in a twelfth implementation of the first aspect of embodiments of this application:

The first enabler server may further indicate the enabler client to directly report the first information to the target client, and the target client determines the dynamic information based on the first information to provide the high-definition map for a service client.

A second aspect of embodiments of this application provides a dynamic information obtaining method. The method includes the following steps.

A first enabler server may further send a first subscription request to a location management server, requesting the location management server to report information about an enabler client in a target area of a target client. Specifically, the first subscription request includes an identifier of the target client and corresponding range information. The location management server tracks a location of the target client based on the identifier of the target client, determines, based on the range information, the target area first and then the enabler client in the target area, and reports the information about the enabler clients to the first enabler server. Then, the first enabler server sends a first message to the enabler client to indicate the enabler client to report first information, where the first message may be used to obtain dynamic information associated with the target client.

In this implementation, the location management server determines the target area and the enabler client in the target area. In this way, the first enabler server may directly obtain the information about the enabler client, so that a workload of the first enabler server can be reduced and working performance of the first enabler server can be improved.

A third aspect of embodiments of this application provides a dynamic information obtaining method. The method includes the following steps.

A service server sends a request message to a first enabler server, where the request message is used to request dynamic information associated with a target client, so that the first enabler server provides a related service. The service server receives the dynamic information.

With reference to the third aspect of embodiments of this application, in a first implementation of the third aspect of embodiments of this application:

The dynamic information associated with the target client includes first dynamic information or second dynamic information, the first dynamic information is dynamic information of a high-definition map dynamic layer of the target client, and the second dynamic information is high-definition map information of the target client.

With reference to the third aspect and the first implementation of the third aspect of embodiments of this application, in a second implementation of the third aspect of embodiments of this application:

The request message may include at least one of the following information: information about a target area of the target client; an identifier and range information of the target client; or an identifier of the target client and auxiliary information of the target client. All the information may be used to determine the target area of the target client, and finally a high-definition map in the target area is obtained for use by a service client.

With reference to the third aspect to the second implementation of the third aspect of embodiments of this application, in a third implementation of the third aspect of embodiments of this application:

When the dynamic information received by the service server is the dynamic information of the high-definition map dynamic layer of the target client, the high-definition map information of the target client may be obtained based on the information, and then the high-definition map information of the target client is provided to the target client.

With reference to the third aspect to the third implementation of the third aspect of embodiments of this application, in a fourth implementation of the third aspect of embodiments of this application:

The service server sends the dynamic information to the target client, so that the target client can use the high-definition map.

A fourth aspect of embodiments of this application provides a dynamic information obtaining method. The method includes the following steps.

A target client may receive first information sent by a plurality of enabler clients, and then obtain dynamic information in a target range based on the first information. The first information is local dynamic information of the plurality of enabler clients, and the dynamic information may include first dynamic information or second dynamic information. The first dynamic information indicates dynamic information of a high-definition map dynamic layer of the target client, and the second dynamic information indicates high-definition map information of the target client.

The target client obtains dynamic information of the target client based on the received first information of the plurality of enabler clients. An environment status in a target area can be detected with reference to local dynamic information of another enabler client, and a complete high-definition map may be obtained for use by the target client. In this way, the high-definition map is used as a reference for the target client to determine a driving action, so that the target client can obtain traffic information of a large range and plan a more proper driving solution.

With reference to the fourth aspect of embodiments of this application, in a first implementation of the fourth aspect of embodiments of this application:

The dynamic information associated with the target client includes the first dynamic information or the second dynamic information, the first dynamic information is the dynamic information of the high-definition map dynamic layer of the target client, and the second dynamic information is the high-definition map information of the target client.

With reference to the fourth aspect and the first implementation of the fourth aspect of embodiments of this application, in a second implementation of the fourth aspect of embodiments of this application:

The target client may obtain the dynamic information with reference to the local dynamic information provided by the another enabler client and local dynamic information corresponding to the target client.

With reference to the fourth aspect to the second implementation of the fourth aspect of embodiments of this application, in a third implementation of the fourth aspect of embodiments of this application:

The target client obtains the dynamic information of the high-definition map dynamic layer, and may also obtain a high-definition map of the target client. If the dynamic information of the high-definition map dynamic layer is obtained, the target client may further obtain the high-definition map of the target client based on the dynamic information of the high-definition map dynamic layer.

With reference to the fourth aspect to the third implementation of the fourth aspect of embodiments of this application, in a fourth implementation of the fourth aspect of embodiments of this application:

When the target client obtains the dynamic information of the high-definition map dynamic layer, the target client may send the dynamic information of the high-definition map dynamic layer to a service client, and the service client obtains the high-definition map of the target client. When the target client obtains the high-definition map of the target client, the target client may send the information about the high-definition map of the target client to the service client, and the service client directly obtains the high-definition map.

A fifth aspect of embodiments of this application provides a first enabler server, including an obtaining unit (e.g., obtaining circuit) and a sending unit (e.g., sending circuit).

The obtaining unit is configured to obtain information about an enabler client in a target area of a target client.

The sending unit is configured to send a first message to the enabler client, where the first message is used for the enabler client reporting first information.

The first information includes local dynamic information of the enabler client, and the first information is used for obtaining dynamic information associated with the target client.

A sixth aspect of embodiments of this application provides a service server, including a sending unit and a receiving unit (e.g., receiving circuit).

The sending unit is configured to send a request message to an enabler server, where the request message is used to obtain dynamic information associated with a target client.

The receiving unit is configured to receive the dynamic information.

A seventh aspect of embodiments of this application provides a target client, where the target client includes a receiving unit and a processing unit (e.g., processing circuit).

The receiving unit is configured to receive first information from an enabler client.

The processing unit is configured to obtain, based on the first information, dynamic information associated with the target client, where the first information includes local dynamic information of the enabler client.

An eighth aspect of this application provides a first enabler server, including at least one processor and a memory. The memory stores computer-executable instructions that can be run on the processor. When the computer-executable instructions are executed by the processor, the first enabler server performs the method according to any one of the first aspect or the possible implementations of the first aspect and the method according to the second aspect.

A ninth aspect of this application provides a service server, including at least one processor and a memory. The memory stores computer-executable instructions that can be run on the processor. When the computer-executable instructions are executed by the processor, the service server performs the method according to any one of the third aspect or the possible implementations of the third aspect.

A tenth aspect of this application provides a terminal device, including at least one processor and a memory. The memory stores computer-executable instructions that can be run on the processor. When the computer-executable instructions are executed by the processor, the terminal device performs the method according to any one of the fourth aspect or the possible implementations of the fourth aspect.

An eleventh aspect of this application provides a dynamic information obtaining system, including a first enabler server, a service server, and a terminal device. The first enabler server is the first enabler server according to the fifth aspect or the eighth aspect, the service server is the service server according to the sixth aspect or the ninth aspect, and the terminal device is the target client according to the seventh aspect or the terminal device according to the tenth aspect.

A twelfth aspect of this application provides a computer-readable storage medium. The computer-readable storage medium stores a computer program. When the computer program is run on a computer, the computer is enabled to perform the method in the first aspect, the second aspect, the third aspect, or the fourth aspect.

A thirteenth aspect of this application provides a chip or a chip system. The chip or the chip system includes at least one processor and a communication interface. The communication interface and the at least one processor are interconnected through a line. The at least one processor is configured to run a computer program or instructions, to perform the dynamic information obtaining method described in any one of the first aspect or the possible implementations of the first aspect.

The communication interface in the chip may be an input/output interface, a pin, a circuit, or the like.

In a possible implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

A fourteenth aspect of this application provides a chip or a chip system. The chip or the chip system includes at least one processor and a communication interface. The communication interface and the at least one processor are interconnected through a line. The at least one processor is configured to run a computer program or instructions, to perform the dynamic information obtaining method described in any one of the second aspect or the possible implementations of the second aspect.

The communication interface in the chip may be an input/output interface, a pin, a circuit, or the like.

In a possible implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

A fifteenth aspect of this application provides a chip or a chip system. The chip or the chip system includes at least one processor and a communication interface. The communication interface and the at least one processor are interconnected through a line. The at least one processor is configured to run a computer program or instructions, to perform the dynamic information obtaining method described in any one of the third aspect or the possible implementations of the third aspect.

The communication interface in the chip may be an input/output interface, a pin, a circuit, or the like.

In a possible implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

A sixteenth aspect of this application provides a chip or a chip system. The chip or the chip system includes at least one processor and a communication interface. The communication interface and the at least one processor are interconnected through a line. The at least one processor is configured to run a computer program or instructions, to perform the dynamic information obtaining method described in any one of the fourth aspect or the possible implementations of the fourth aspect.

The communication interface in the chip may be an input/output interface, a pin, a circuit, or the like.

In a possible implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

A seventeenth aspect of this application provides a computer program. When the computer program is run on a computer, the computer is enabled to perform the method in the first aspect, the second aspect, the third aspect, or the fourth aspect.

In the technical solution provided in embodiments of this application, the first enabler server may indicate the enabler client in the target area of the target client to report the local dynamic information of the enabler client. In this way, the high-definition map can be obtained based on the local dynamic information collected by the plurality of enabler clients in the target area, and can completely reflect the traffic environment of the target area. In this way, the high-definition map is used as the reference for the target client to determine the driving action, so that the target client can obtain the traffic information of a large range and plan the more proper driving solution.

DESCRIPTION OF EMBODIMENTS

Embodiments of this application provide a dynamic information obtaining method and a related device thereof, to obtain high-definition map information in a corresponding target area of a target client, so that the target client can obtain a high-definition map in a proper range based on a requirement of the target client.

A high-definition map is generally applied to an autonomous driving field, and is a dynamic map drawn based on data collected by a detection device of a vehicle including radar, a camera, an infrared ray, a sensor, and the like. The high-definition map can reflect a traffic status around the vehicle, so that the vehicle can plan a driving route based on the high-definition map, to complete an autonomous driving process.

Figure 1:
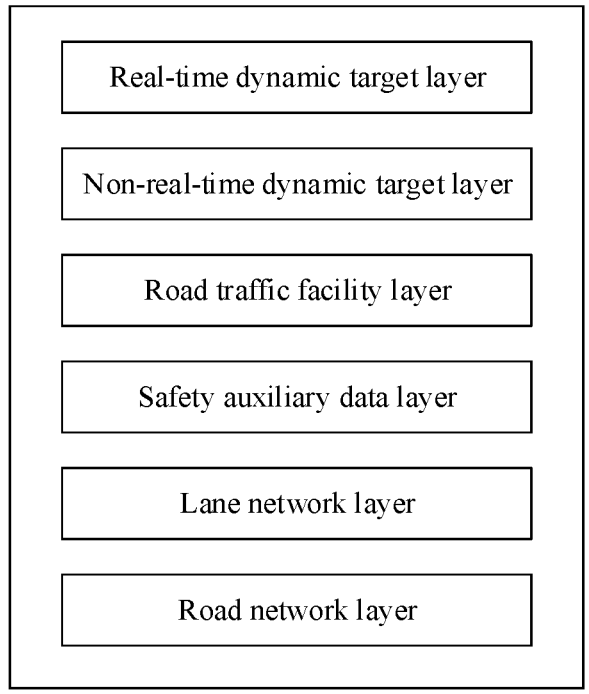
FIG. 1 is a schematic diagram of a structure of a high-definition map according to an embodiment of this application.

FIG. 1 is a schematic diagram of a structure of a high-definition map according to an embodiment of this application. The high-definition map may be sequentially divided from a bottom layer up into a road network layer, a lane network layer, a safety auxiliary data layer, a road traffic facility layer, a non-real-time dynamic target layer, and a real-time dynamic target layer. The road network layer may be a road that is in an area in which a vehicle is located and that is obtained based on a positioning system. The lane layer is a lane on the road. Safety auxiliary data may include a limited speed, a limited height, and the like. The road traffic facility layer may include a traffic light, a road boundary rail, and the like. The non-real-time dynamic target layer may be a road condition, including an area circled during road maintenance, a water pit on the road, and the like. The real-time dynamic target layer includes a pedestrian on the road, another vehicle, and the like. It may be understood that a higher layer indicates more dynamic information reflected by the layer. Therefore, a higher level of autonomous driving, that is, more intelligent autonomous driving, requires more layers of the high-definition map. For example, to implement intelligent navigation of the vehicle, a map only including the road network layer, the lane network layer, and the safety auxiliary data network layer is required. To implement intelligent traffic management, the high-definition map further uses the road traffic facility layer. To implement assisted driving of the vehicle, the non-real-time dynamic target layer is required. To implement unmanned driving of the vehicle, the real-time dynamic target layer is required for a corresponding high-definition map.

Figure 2:
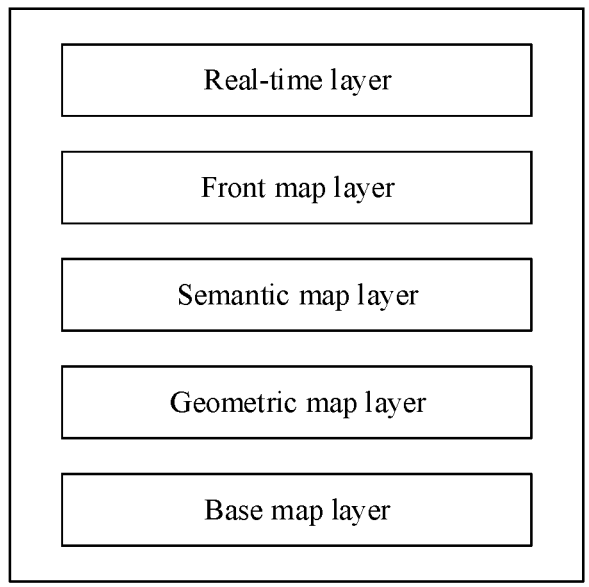
FIG. 2 is a schematic diagram of a structure of another high-definition map according to an embodiment of this application.

FIG. 2 is a schematic diagram of a structure of another high-definition map according to an embodiment of this application. The high-definition map may be divided from bottom to top into a base map layer, a geometric map layer, a semantic map layer, a front map layer, a real-time layer, and the like. It may be understood that a layer at a higher layer corresponds to more real-time information. Specifically, the base map layer may include a basic terrain and a road network. The geometric map layer may be a lane network. The semantic map layer is built on the geometric map layer and added with some semantic objects, including a lane boundary, a crossroad, a stop point, a stop sign, a traffic signal light, and the like. These objects include rich information, such as a traffic speed limit value and a lane change restriction (for example, U-turn prohibition). The front map layer may include dynamic information and human activity data, for example, a change of a traffic signal light, average waiting time of a traffic signal light at an intersection, a probability of a vehicle stopping at a parking spot, an average parking speed of a parking spot, and the like. The real-time layer is a top layer of the high-definition map, and includes real-time shared traffic information between different vehicles, to be specific, the layer may include information such as a real-time distance between another vehicle and a vehicle, a vehicle speed of the another vehicle, a real-time road condition, and a pedestrian.

In a conventional technology, a vehicle may draw a high-definition map on a local client based on sensor data that is collected by sensors (for example, radar and a camera) of the vehicle and that is aggregated by a main control computer of the vehicle and server information (for example, a traffic signal light and parking lot information) obtained through a client, to provide a reference for the main control computer and determine a driving planning route. However, it may be understood that a range of detection information of a sensor carried by each vehicle is limited.

For example, in autonomous driving, if a vehicle is driving on a common road, the vehicle needs to learn a traffic condition within a range of 500 meters around the vehicle in real time, summarize information within the range to obtain a high-definition map, and continuously update and obtain new information based on an update frequency to refresh the high-definition map. Based on this, the vehicle performs a next driving action. However, for a high-speed driving vehicle, real-time data of a larger range is usually required to support remote driving or autonomous driving. Due to a limitation of a detection range of a sensor, the vehicle can obtain only a high-definition map that is consistent with the detection range of the sensor, and cannot obtain a high-definition map within a proper range based on a driving requirement of the vehicle. In addition, once a range of the high-definition map required by the vehicle is greater than the detection range of the sensor, based on detection and analysis of the vehicle on a visible object, the vehicle cannot obtain information about a high-definition map layer within a required range. This seriously affects driving planning of the vehicle, and intelligent and safe driving cannot be implemented.

Figure 3:
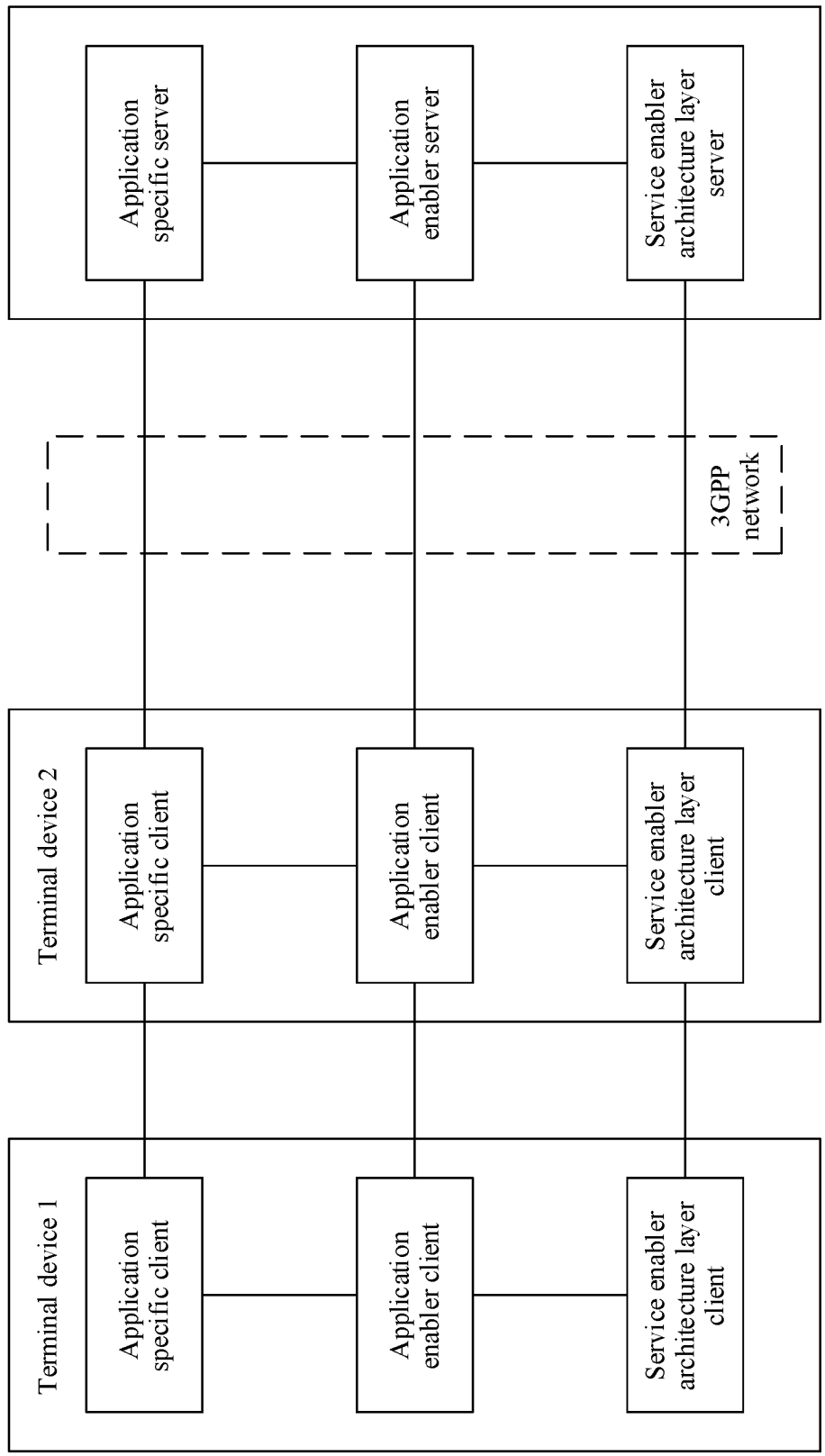
FIG. 3 is a schematic diagram of an architecture of an application layer for information exchange of vehicle-to-everything (V2X) according to an embodiment of this application.

The following describes a network framework according to an embodiment of this application. FIG. 3 is a schematic diagram of an architecture of an application layer for information exchange of vehicle-to-everything (V2X) according to some embodiments. As shown in FIG. 3, a vehicle terminal user equipment (UE) may include a V2X application specific client, a V2X application enabler client, and a service enabler architecture layer client. The V2X application specific client is connected to a V2X application specific server by using a third generation partnership project (3GPP) network system. The V2X application enabler client is connected to a V2X application enabler server by using the 3GPP network system. The service enabler architecture layer client is connected to a service enabler architecture layer server by using the 3GPP network system.

The V2X application specific client provides a client function of a V2X application on a terminal side, and is referred to as a service client for short. For example, a V2X application client program may be included. The client may use a service provided by the V2X application enabler client. For example, the client may be similar to a platoon application. The V2X application specific server is a function of a server of the V2X application, corresponds to the V2X application specific client, and is referred to as a service server for short. The V2X application specific server may provide a corresponding service for the service client by using functions provided by the V2X application enabler server and the service enabler architecture layer server.

The V2X application enabler client (VAE client) is an enabler client of a V2X application enabler layer on the terminal side, and may interact with the V2X service client to support running of a V2X service. Specifically, the V2X application enabler client may support the following functions: registering with the V2X application enabler server to receive a V2X message, receiving a message distributed by the V2X application enabler server and delivering the received message to a corresponding V2X application based on a V2X service ID, undertaking a function of performing multicast for a service user, receiving a network monitoring report, supporting switching of a V2X communication pattern, providing application layer location information to the V2X application enabler server, and the like. For example, the V2X application enabler client may be a Baidu map client, a Gaode map client, or the like.

The V2X application enabler server (VAE server) is a function of the V2X application enabler layer on a server side, and may provide a function for the V2X application specific server. The V2X application enabler server and the V2X application enabler client are a pair of functional entities of the enabler layer. Specifically, the V2X application enabler server may communicate with a 3GPP network element to obtain a unicast or broadcast communication resource, receive a monitoring report and an event about a network status from the 3GPP network element, receive registration of a V2X terminal UE, trace an application-layer geographic location of the V2X terminal, support distribution of a V2X message at the application layer, configure a 3GPP system communication parameter for the V2X UE, undertake a function of a V2X content provider and provide a monitoring event for the V2X application specific server, provide a network monitoring report for the UE, negotiate a V2X service parameter with a 3GPP system, maintain a mapping relationship between a V2X user identifier and a V2X UE identifier, provide a V2X service discovery function and support V2X service continuity, and the like.

The service enabler architecture layer client (SEAL client) is a general term for a group of client functions of an enabling service on the terminal side. The service enabler architecture layer client may provide a service for the V2X application specific client, the V2X application enabler client, and an application client function in another industry. Specifically, the service enabler architecture layer client may be a group management client, a configuration client, an identifier client, a key management client, or a location management client, and provides a client side function corresponding to a peer server.

The service enabler architecture layer server (SEAL server) is a general term for a group of functions of the enabling service on the server side. The server may provide a service for the V2X application specific server, the V2X application enabler server, and an application server function in another industry. Specifically, the service enabler architecture layer server may be a group management server configured to provide a group management function such as group creation, group update, group member addition and deletion, or group deletion, a configuration server configured to provide some configuration information used for service running, such as user configuration information, an identifier server configured to perform authentication and authorization management on a user identifier, a key management server configured to provide a root key or a session key for communication and other key-related materials, and a location management server configured to manage a location of a user or a group, including location subscription, location reporting, location pushing, and the like.

The V2X terminal includes a mobile communication module (e.g., modem) configured to receive a radio signal and receive and send uplink and downlink data and the foregoing client configured to process service logic related to an application. The V2X application specific client, the V2X application enabler client, and the service enabler architecture layer client are all logical functional modules running on the V2X terminal. They may be independent client application programs and have independent running space. The V2X application enabler client and the service enabler architecture layer client may be collectively referred to as an enabler client. The V2X application enabler client and the service enabler architecture layer client may be combined and implemented in one program component, for example, a sub-function module or component in an operating system, or a software development kit (SDK), or a dynamic or static runtime library (lib). The V2X terminal device may be an intelligent vehicle, a vehicle with an assisted driving capability, a vehicle with an advanced autonomous driving capability, or the like.

However, in some embodiments, a function provided by a high-definition map service provider may be integrated into the V2X application enabler server, or may be integrated into the location management server of the service enabler architecture layer server, or may be integrated into the independent V2X application specific server (the service server).

Figure 4:
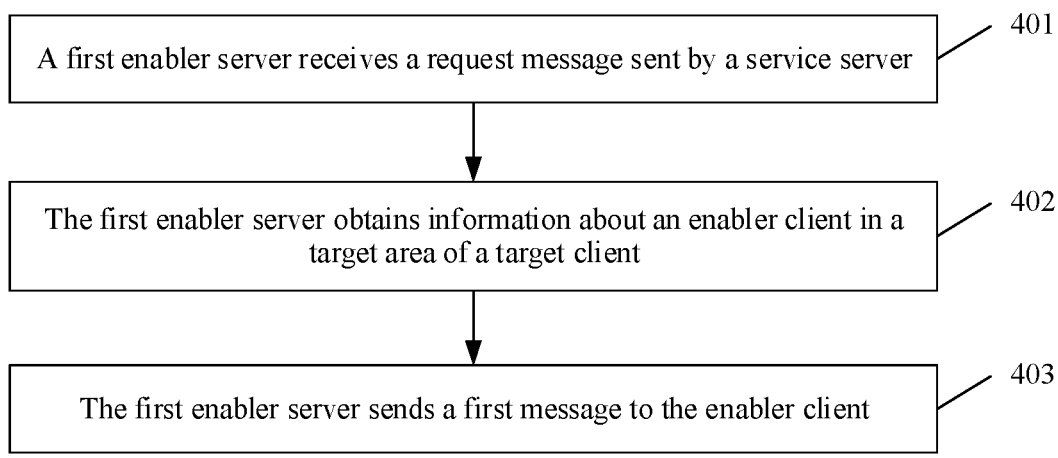
FIG. 4 is a schematic flowchart of another dynamic information obtaining method according to an embodiment of this application.

FIG. 4 is a schematic flowchart of a dynamic information obtaining method according to an embodiment of this application. As shown in FIG. 4, the method includes the following steps.

401: A first enabler server receives a request message sent by a target device.

A V2X terminal device includes various sensors and a main control computer. The sensor is configured to collect traffic status information around an intelligent vehicle and detect an external driving environment of the intelligent vehicle. The main control computer controls a driving behavior of the intelligent vehicle based on the external driving environment and determine a driving path of the intelligent vehicle.

The target device may be a service server or an enabler client, and the enabler client may be a V2X enabler client or a service enabler architecture layer client (for example, a newly added high-definition map enabler client). The first enabler server is a V2X enabler server or a service enabler architecture layer server (for example, a newly added high-definition map enabler server) that is equivalent to the service enabler architecture layer client. That is, the enabler client and the first enabler server are a pair of a client and a server that are equivalent to each other in function.

When the intelligent vehicle starts driving and requires a high-definition map service to assist the driving, the following operations can be performed.

(1) A service client on the V2X terminal device sends a service request to request a high-definition map service from a service server corresponding to the service client. In this case, the target device is the service server, and a target client is the service client. It may be understood that when providing a service for the service client, the service server may send a request message to the first enabler server to obtain high-definition map information corresponding to the service client or dynamic information of a high-definition map dynamic layer corresponding to the service client. For example, the service server may request the first enabler server to provide dynamic information. The dynamic information includes first dynamic information (the dynamic information of the high-definition map dynamic layer of the target client) or second dynamic information (the high-definition map information of the target client). It may be understood that the first dynamic information may be used to generate the second dynamic information, and the service client may further control a driving action of the intelligent vehicle based on the obtained second dynamic information to complete autonomous driving of the intelligent vehicle.

(2) The enabler client on the V2X terminal device sends a request message to the first enabler server. In this case, the target device is the enabler client. A target client is a service client on the terminal device. In this case, the service client invokes a service provided by the enabler client, to trigger the enabler client to help the service client obtain dynamic information of a high-definition map dynamic layer or high-definition map information.

It can be understood that, when the enabler client supports an enabling service for the service client, the service client may trigger the enabler client to send the request message to the first enabler server, to be specific, the first enabler server provides information associated with a high-definition map, and then provides the information for the service client. For example, the enabler server may request the first enabler server to provide dynamic information. The dynamic information includes first dynamic information (dynamic information of a high-definition map dynamic layer of the target client) or second dynamic information (high-definition map information of the target client). It may be understood that the first dynamic information may be used to generate the second dynamic information, and the service client may further control a driving action of the intelligent vehicle based on the obtained second dynamic information to complete autonomous driving of the intelligent vehicle.

(3) A second enabler server sends a request message to the first enabler server, to obtain high-definition map information corresponding to a target client or dynamic information of a high-definition map dynamic layer corresponding to a target client. The request may include information about a target area, or an identifier of the target client and range information (which may be understood as a range of a high-definition map corresponding to the target client) of the target client, or an identifier of the target client and auxiliary information of the target client. In this case, the target device is the second enabler server.

402: The first enabler server obtains information about an enabler client in a target area of a target client.

The first enabler server obtains the target area corresponding to the target client. The target area corresponding to the target client may be understood as an area including the target client.

When the target device requests the first enabler server to provide the high-definition map service, the first enabler server determines the first dynamic information or the second dynamic information based on local dynamic information of the enabler client in the target area corresponding to the target client. It may be understood that, to meet a different driving requirement of an intelligent vehicle, for different intelligent vehicles, range sizes or area sizes of high-definition maps corresponding to the intelligent vehicles are also different. Therefore, a specific area needs to be planned for a specific intelligent vehicle (in the present disclosure, an area of a high-definition map corresponding to the target client is referred to as the target area), and the first enabler server provides high-definition map information in the target area for the target client. It may be understood that the area (the target area) may be an area in a form of a circle, a rectangle, a polygon, or the like, or may be an area identified by using the target client as a center and specifying a specific range (for example, a radius or a diameter). The target area may be a fixed geographical area, or a moving area including the target client.

The first enabler server obtains the information about the enabler client in the target area corresponding to the target client.

When the target area corresponding to the target client is determined, because a sensor detection range of the intelligent vehicle corresponding to the target client is limited, a complete traffic environment in the target area cannot be detected only by using dynamic traffic information collected by a sensor of the intelligent vehicle, that is, complete dynamic information of the target area cannot be obtained. Local dynamic information of at least one enabler client in the target area also is used to determine high-definition map information (or dynamic information of a dynamic layer of a high-definition map) corresponding to the target area of the target client. Therefore, the first enabler server obtains the information about the enabler client in the target area to determine at least one enabler client.

The target device is the service server or the enabler client.

403: The first enabler server sends a first message to the enabler client.

After determining the at least one enabler client, the first enabler server sends the first message to the enabler client. The first message indicates the enabler client to report first information. It may be understood that the first information may be local dynamic information obtained by a V2X terminal device corresponding to the enabler client and includes, for example, a driving speed, a driving direction, or a driving status (normal driving, acceleration, deceleration, overtaking, lane change, fault, and the like) of the V2X terminal device, and other information detected by the V2X terminal device, for example, a speed, a direction, or a status of a nearby vehicle, a nearby pedestrian, a detected road object (for example, a stone, a pit, a tree branch, and garbage), or detected status information of a traffic signal light (for example, a color and remaining time of the traffic signal light). The V2X terminal device may obtain the local dynamic information from a sensor, a roadside unit, another V2X device (for example, another vehicle) that can directly communicate with the V2X terminal device, or the like. The at least one enabler client may include an enabler client corresponding to the target client, and "corresponding to" indicates that the target client and the enabler client are located in a same V2X terminal device. After receiving dynamic information reported by the at least one enabler client, the first enabler server may determine dynamic information of the target area based on the at least one piece of dynamic information. The first enabler server may alternatively choose to send the first message to a part or all of the at least one enabler client based on density and distribution of the at least one enabler client in the target area, and a capability of the enabler client.

For example, the first enabler server may obtain first information reported by the at least one enabler client, generate, by using a plurality of pieces of first information, dynamic information associated with the target client, and then provide the dynamic information to the target client. In this way, the target client may obtain the high-definition map information corresponding to the target area, and control, based on the high-definition map information, a driving behavior of the intelligent vehicle corresponding to the target client.

In the technical solution provided in some embodiments, the first enabler server first obtains the information about the enabler client in the target area of the target client, then sends the first message to the enabler client to indicate the enabler client to report the local dynamic information of the enabler client, and then generates, based on the local dynamic information, the dynamic information associated with the target client, so that the target client can control, based on the dynamic information, the driving behavior of the intelligent vehicle corresponding to the target client. In this way, the intelligent vehicle can obtain a high-definition map in a target range based on a different requirement, so that the high-definition map meets the different driving requirements. This more effectively assists the driving behavior of the intelligent vehicle, and improves safety and reliability of the autonomous driving.

Figure 5:
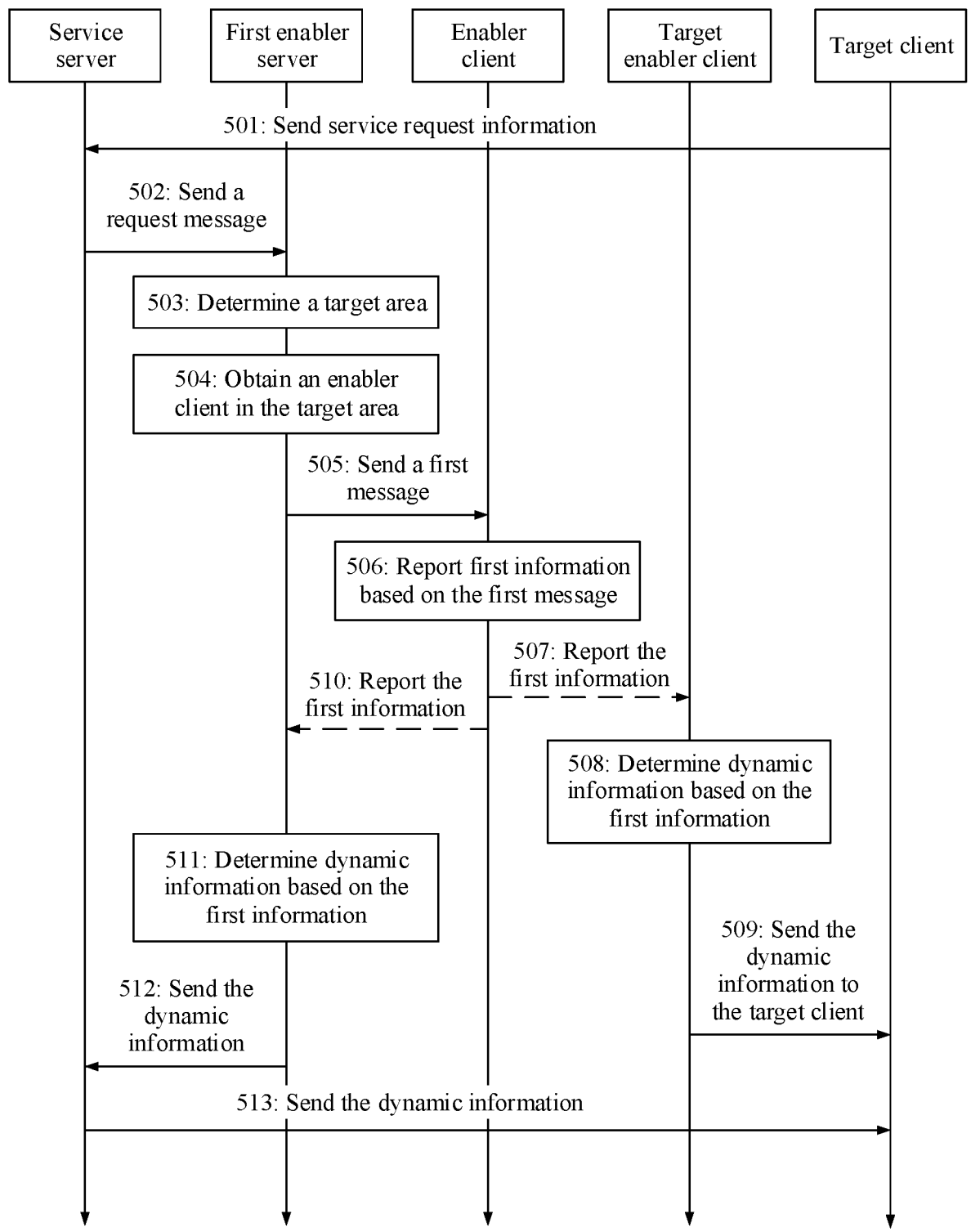
FIG. 5 is a schematic flowchart of another dynamic information obtaining method according to an embodiment of this application.

FIG. 5 is a schematic flowchart of another dynamic information obtaining method according to an embodiment of this application. As shown in FIG. 5, the method includes the following steps.

501: A target client sends service request information to a service server.

This step is optional. The target client is a service client. When an intelligent vehicle needs a high-definition map to assist the intelligent vehicle in determining a driving action, a user may start a high-definition map generation and update procedure by using a service client of the intelligent vehicle and send the service request information to the service server. Then, the service request information triggers the service server to perform a subsequent operation, so that the target client obtains high-definition map information required by the target client.

The service request information is a session establishment request message, a remote control request message, or a high-definition map service subscription request message. For example, when the service server receives a session establishment request for remote control (e.g., tele-operated driving, ToD) from the target client, the service server triggers a procedure of obtaining high-definition map information or dynamic information of a high-definition map dynamic layer. Specifically, the service server sends a request message to a first enabler server. Alternatively, when the service server receives a request message that the target client requests the service server to perform remote control, or when the target client subscribes to a high-definition map service from the service server, the target client requests to obtain a high-definition map during a travel period of the vehicle, and the service server triggers a procedure of obtaining high-definition map information or dynamic information of a high-definition map dynamic layer. Specifically, the service server sends a request message to a first enabler server.

In another manner, when the service server determines to remotely control an intelligent vehicle corresponding to the target client, the service server triggers obtaining of high-definition map information corresponding to the target client or dynamic information of a high-definition map dynamic layer corresponding to the target client. Specifically, the service server sends a request message to a first enabler server.

Specifically, the service request information may include an identifier of the target client and auxiliary information of the target client. It may be understood that the identifier of the target client may be at least one or a combination of an identifier of an application user that uses the target client (for example, a user identifier of a ToD client), an identifier of an enabler client, an identifier of a V2X terminal device on which the target client is located, for example, a generic public subscription identifier (GPSI), an internet protocol (IP) address, and the like.

The auxiliary information of the target client may be at least one of a type of a service that the target client participates in, a sensor measurement range of a terminal device corresponding to the target client, capability information of the terminal device corresponding to the target client, a speed of the target client, a direction of the target client, and a planned path of the target client. The auxiliary information of the target client may be used to determine an appropriate range of a high-definition map of the intelligent vehicle, so that the high-definition map better assists a driving behavior of the intelligent vehicle.

It may be understood that the target client runs on the V2X terminal device, and the service type that the target client participates in may be a driving type corresponding to the V2X terminal device. For example, the driving type is autonomous driving or remote control driving, and the autonomous driving further includes an autonomous driving level (any level from LoA1 to LoA5). For different driving types, there are different requirements for ranges of high-definition maps. For example, because the remote control driving is controlled by a person, a range of a high-definition map required by the remote control driving may be small. However, the autonomous driving uses an unmanned autonomous control manner, and to prevent an emergency, a real-time traffic environment condition in a larger range needs to be detected, and a high-definition map in a larger range is required. Similarly, the sensor measurement range corresponding to the target client is a sensor measurement range of the intelligent vehicle. For example, a larger sensor measurement range of the intelligent vehicle indicates easier detection of a traffic environment condition in a larger range. In this way, a high-definition map in a larger range can be determined for the intelligent vehicle. The capability information of the terminal device corresponding to the target client may be performance corresponding to the intelligent vehicle, for example, a braking speed of the vehicle, startup performance of the vehicle, and information indicating whether the intelligent vehicle has a capability to perform communication between short-distance devices (for example, a PC5 or dedicated short-range communications (DSRC) communication capability). The speed of the target client is a current driving speed of the intelligent vehicle. The direction of the target client is a driving direction of the vehicle. The planned path of the target client may be used to determine a road that the intelligent vehicle is to pass through. For example, a range of a high-definition map required by the intelligent vehicle may be determined based on a congestion status of the road.

502: The service server sends a request message to the first enabler server.

It may be understood that the service server requests a service from the first enabler server, where the request message is used to obtain dynamic information (related information of a high-definition map) associated with the target client.

The request message may include information about a target area, or the identifier of the target client and range information (which may be understood as a range of a high-definition map corresponding to the target client) of the target client, or the identifier of the target client and the auxiliary information of the target client.

Optionally, the service server determines the range of the high-definition map corresponding to the target client. Specifically, the service server determines, based on the obtained auxiliary information of the target client, the range (for example, a radius or a diameter) of the high-definition map corresponding to the target client. Specifically, for example, the service server determines, based on an autonomous driving level in the auxiliary information, that the range of the high-definition map corresponding to the target client is X meters, where X is a preset value. For another example, the auxiliary information is modeled and a weight is assigned to obtain a corresponding range value through calculation by using an algorithm. A location of the target client and the range of the high-definition map corresponding to the target client represent a target area of the high-definition map corresponding to the target client. In this case, the service server requests the enabler server to monitor movement of the target client and the location of the target client. It may be understood that a size of the target area is specified by the service server, and a location of the target area is determined by the enabler server based on the location of the target client. In this case, the service server may send one request to the enabler server to obtain, for multiple times, the dynamic information associated with the target client.

Optionally, the service server determines the target area of the high-definition map corresponding to the target client. Specifically, the service server determines, based on the obtained auxiliary information of the target client, the target area of the high-definition map corresponding to the target client. The target area may be an area such as a circle, a rectangle, or a polygon. Specifically, for example, the service server determines, based on the autonomous driving level in the auxiliary information, that the area of the high-definition map corresponding to the target client is a circular area or geographical coordinates X meters from a current location of the target client, where X is a preset value. For another example, the auxiliary information is modeled and a weight is assigned to obtain a size of the corresponding circular area or geographical coordinates through calculation by using an algorithm. In this case, the service server monitors the movement of the target client and the location of the target client. When the target client moves to a new location and the dynamic information needs to be updated, the service server provides information about a new target area to the enabler server. In this case, the service server sends one request to the enabler server to obtain dynamic information of the target client in the area.

Optionally, the request message may further include an update policy of the dynamic information.

503: The first enabler server determines a target area corresponding to the target client.

The first enabler server may determine the target area in the following manners.

Manner 1: The first enabler server uses the target area in the request message sent by the service server as the target area.

When the service server determines the target area corresponding to the target client, the request message sent by the service server to the first enabler server includes the information about the target area. The first enabler server determines the received target area as the target area. In this case, the enabler server does not need to track location coordinates of the intelligent vehicle corresponding to the target client, and only needs to receive the determined target area. Therefore, to update the high-definition map, the service server tracks a dynamic target area of the intelligent vehicle. A service server determines, based on the update policy and the location movement of the target client, a latest target area corresponding to the target client, and sends, to the first enabler server, the request message including the latest target area corresponding to the target client. For example, if the service server determines that the update policy is updating the high-definition map every 5 s, the service server determines the target area every 5 s, and send the request message to the first enabler server every 5 s.

Manner 2: The first enabler server determines the target area based on the received identifier of the target client and the received range information of the target client.

When the service server determines, based on the obtained auxiliary information of the target client, the range of the high-definition map corresponding to the target client, and sends the range to the first enabler server, the first enabler server may determine, based on the range, the target area corresponding to the target client. The first enabler server may track, based on the identifier of the target client, location coordinates of the intelligent vehicle, and then determine the target area corresponding to the target client based on the location coordinates and the obtained range of the high-definition map corresponding to the target client. Optionally, the first enabler server may further receive the update policy sent by the service server. For example, if the update policy received by the first enabler server is updating the high-definition map every 5 s, the first enabler server determines the location coordinates of the intelligent vehicle every 5 s or at an interval less than 5 s and determine the target area once based on the location coordinates.

Manner 3: The first enabler server determines the target area based on the received identifier of the target client and the received auxiliary information of the target client.

When the service server sends the identifier of the target client and the auxiliary information of the target client to the first enabler server, the first enabler server may determine, based on the auxiliary information of the target client, the range of the high-definition map corresponding to the target client or the target area corresponding to the target client. It may be understood that a manner in which the first enabler server determines the range of the high-definition map corresponding to the target client or the target area corresponding to the target client is similar to that of the service server. Details are not described herein again. In another implementation, after determining the range of the high-definition map corresponding to the target client, the first enabler server may further determine location coordinates of the intelligent vehicle based on the identifier of the target client, and then determine the target area based on the location coordinates and the range of the high-definition map corresponding to the target client.

504: The first enabler server obtains an enabler client in the target area.

After the first enabler server determines the target area, the first enabler server obtains at least one enabler client in the target area. Each of the at least one enabler client runs in the V2X terminal device. Therefore, more comprehensive dynamic information is obtained based on as much local dynamic information that is collected by the V2X terminal devices as possible in the target area and that corresponds to the V2X terminal device, to obtain a more comprehensive and more accurate high-definition map in the target area corresponding to the target client.

Specifically, the first enabler server may obtain the enabler client in the target area in the following manners.

(1) The first enabler server may locally obtain a plurality of enabler clients in the target area.

(2) The first enabler server obtains the enabler client in the target area from a location management server. Specifically, the first enabler server sends a first request message to the location management server, to request the location management server to provide information about the enabler client in the target area. The first request message includes the information about the target area, where the information about the target area may be information such as a circle, a rectangle, or a polygon, or may be the identifier of the target client and the range information of the target client, or may be the location of the target client and the range information of the target client.

(3) The first enabler server obtains information about the enabler client in the target area from another enabler server. Specifically, the first enabler server sends the information about the target area to a second enabler server, where the information about the target area may be information such as a circle, a rectangle, or a polygon, or may be the identifier of the target client and the range information of the target client, or may be the location of the target client and the range information of the target client. The first enabler server obtains the information about the enabler client located in the target area from the second enabler server.

505: The first enabler server sends a first message to the enabler client.

It may be understood that, when determining the at least one enabler client in the target area, the first enabler server indicates, by using the first message, the at least one enabler client to report first information. The first information may be the local dynamic information of the V2X terminal device corresponding to the enabler client, and the first information is used to generate the dynamic information of the high-definition map dynamic layer or the high-definition map information. For detailed descriptions of the first information, refer to the foregoing descriptions. Details are not described herein again.

For example, the first message may be a second request message or a second subscription request. Details are as follows.

If the first message is the second request message, the enabler client sends a response message of a second request to the first enabler server. One second request message corresponds to one response message of the second request, and the response message of the second request includes the first information. It may be understood that, to obtain the high-definition map information corresponding to the target client or the information of the high-definition map dynamic layer corresponding to the target client, the first enabler server sends the second request message to the enabler client for multiple times according to the update policy.

If the first message is the second subscription request message, the first enabler server may subscribe to first information corresponding to the enabler client from the enabler client. Optionally, if the second subscription request message includes an event trigger for reporting the first information or a reporting period, the enabler client reports the first information based on the event trigger or the reporting period that is set in the subscription request. Optionally, the second subscription request may include a reporting policy, and the reporting policy is determined according to the update policy. The event trigger for reporting the first information or the reporting period may also be a part of the reporting policy. For example, if the update policy is updating the high-definition map every 5 s, the reporting policy may be reporting the first information every 5 s, or the reporting policy may be reporting the first information every 3 s. Optionally, the second subscription request further includes a validity period of a subscription. The validity period indicates that the subscription becomes invalid when the validity period expires, and the client does not report the first information to the first enabler server any more.

506: The enabler client reports the first information based on the first message.

When receiving the first message, the enabler client determines, based on the content described in step 505, how to report the first information. Optionally, the first message may further include reporting address information (e.g., an endpoint) of the first information. The reporting address information indicates an entity to which the enabler client reports the first information. The reporting address information indicates that a target entity to which the first information is reported is the first enabler server and/or a target enabler client (which may be understood as that a receiving entity of the first information is the first enabler server and/or the target enabler client). If the reporting address information is not carried, the enabler client reports the first information to the first enabler server by default. For specific descriptions of the first information, refer to the foregoing descriptions. Details are not described herein again. The target enabler client is an enabler client located in a same V2X terminal as the target client, and the target enabler client and the first enabler server are a pair of an enabler client and an enabler server that are logically equivalent. To be specific, when the target enabler client is a VAE client, the first enabler server is a VAE server, or when the target enabler client is a high-definition map service enabler client, the first enabler server is a high-definition map service enabler server.

For example, when the first message received by the enabler client is the second request message, the enabler client may send the response message of the second request, and send the first information to a specified reporting address in the response message of the second request. When the first message received by the enabler client is the second subscription request, the enabler client may further determine, according to the reporting policy included in the second subscription request, when to report the first information. For example, if the reporting policy in the second subscription request is reporting the first information every 5 s, the enabler client reports the first information every 5 s.

When the enabler client reports the first information to the target enabler client, step 507 to step 509 are performed. When the enabler client reports the first information to the first enabler server, step 510 to step 513 are performed.

507: The enabler client reports the first information to the target enabler client.

The enabler client reports the first information to the target client based on that a reporting address of the first information is an address of the target enabler client.

It may be understood that the enabler client may further report the first information to a target enabler client by using the first enabler server. Specifically, the enabler client reports the first information to the first enabler server, and then the first enabler server forwards the first information to the target enabler client.

508: The target enabler client determines the dynamic information based on the first information.

When receiving the first information, the target enabler client may process the first information (for example, perform operations such as deduplication, aggregation, and modeling on the first information from the at least one enabler client) to generate dynamic information. For example, the target enabler client may generate the dynamic information of the high-definition map dynamic layer based on the first information, or may directly generate the high-definition map information of the target client. It may be understood that the dynamic information of the high-definition map dynamic layer is also used to generate the high-definition map information. This is not specifically limited.

Optionally, the target enabler client further obtains local dynamic information corresponding to the target enabler client, and the target enabler client determines the dynamic information based on the first information and the local dynamic information corresponding to the target enabler client. The determining of the dynamic information may also be understood as generating or updating the dynamic information.

509: The target enabler client sends the dynamic information to the target client.

When the target enabler client generates the high-definition map information of the target client, the target client may directly obtain the high-definition map based on the high-definition map information, to assist in generating a driving solution of the intelligent vehicle corresponding to the target client. When the target enabler client provides the dynamic information of the high-definition map dynamic layer for the target client, the target client further generates the high-definition map based on the dynamic information of the high-definition map dynamic layer, and provide a reference for generating a driving action of the intelligent vehicle.

510: The enabler client reports the first information to the first enabler server.

The enabler client reports the first information to the first enabler server based on that a reporting address of the first information is an address of the first enabler server or a reporting address is not provided.

Optionally, the enabler client further includes the target enabler client, to be specific, the target enabler client reports the first information to the first enabler server.

511: The first enabler server determines the dynamic information based on the first information.

It may be understood that a manner in which the first enabler server determines the dynamic information based on the first information is similar to the manner in which the target enabler client determines the dynamic information based on the first information in step 508. For example, the first enabler server performs operations such as deduplication, aggregation, and modeling on the first information from the at least one enabler client. Details are not described again.

Optionally, the first information further includes local dynamic information corresponding to the target enabler client. In this case, that the first enabler server determines the dynamic information based on the first information further indicates that the first enabler server determines the dynamic information based on the first information including the target enabler client. The determining the dynamic information may also be understood as generating or updating the dynamic information.

Optionally, the first enabler server requests, from the other enabler server, the dynamic information corresponding to the target client, where the dynamic information is the dynamic information of the high-definition map dynamic layer or the high-definition map information. In this case, the first enabler server sends a request message to the second enabler server, where the request message is used to obtain the dynamic information (including the high-definition map information or the dynamic information of the high-definition map dynamic layer) corresponding to the target client. For specific detailed descriptions of obtaining the dynamic information (including the high-definition map information or the dynamic information of the high-definition map dynamic layer) by the second enabler server, refer to the descriptions of obtaining the dynamic information (including the high-definition map information or the dynamic information of the high-definition map dynamic layer) by the first enabler server. Details are not described again.

Optionally, the first enabler server generates final dynamic information of the target client based on the first information and the dynamic information from the second enabler server.

512: The first enabler server sends the dynamic information to the service server.

The first enabler server sends the dynamic information to the service server, and the service server receives the dynamic information sent by the first enabler server. Specifically, the dynamic information includes the dynamic information of the high-definition map dynamic layer or the high-definition map information.

513: The service server sends the dynamic information to the target client.

When the dynamic information includes the high-definition map information of the target client, the service server directly sends the high-definition map information to the target client.

When the dynamic information includes the dynamic information of the high-definition map dynamic layer, the service server further generates the high-definition map information based on the dynamic information of the high-definition map dynamic layer. The service server sends the high-definition map information to the target client.

In the technical solution provided in some embodiments, the first enabler server first obtains the information about the enabler client in the target area of the target client, sends the first message to the enabler client to indicate the enabler client to report the local dynamic information of the enabler client, and then generates, based on the local dynamic information, the dynamic information associated with the target client, so that the target client can control, based on the dynamic information, the driving behavior of the intelligent vehicle corresponding to the target client. In this way, the intelligent vehicle can obtain a high-definition map in a target range based on a different requirement, so that the high-definition map meets the different driving requirements. This more effectively assists the driving behavior of the intelligent vehicle, and improves safety and reliability of the autonomous driving.

Figure 6:
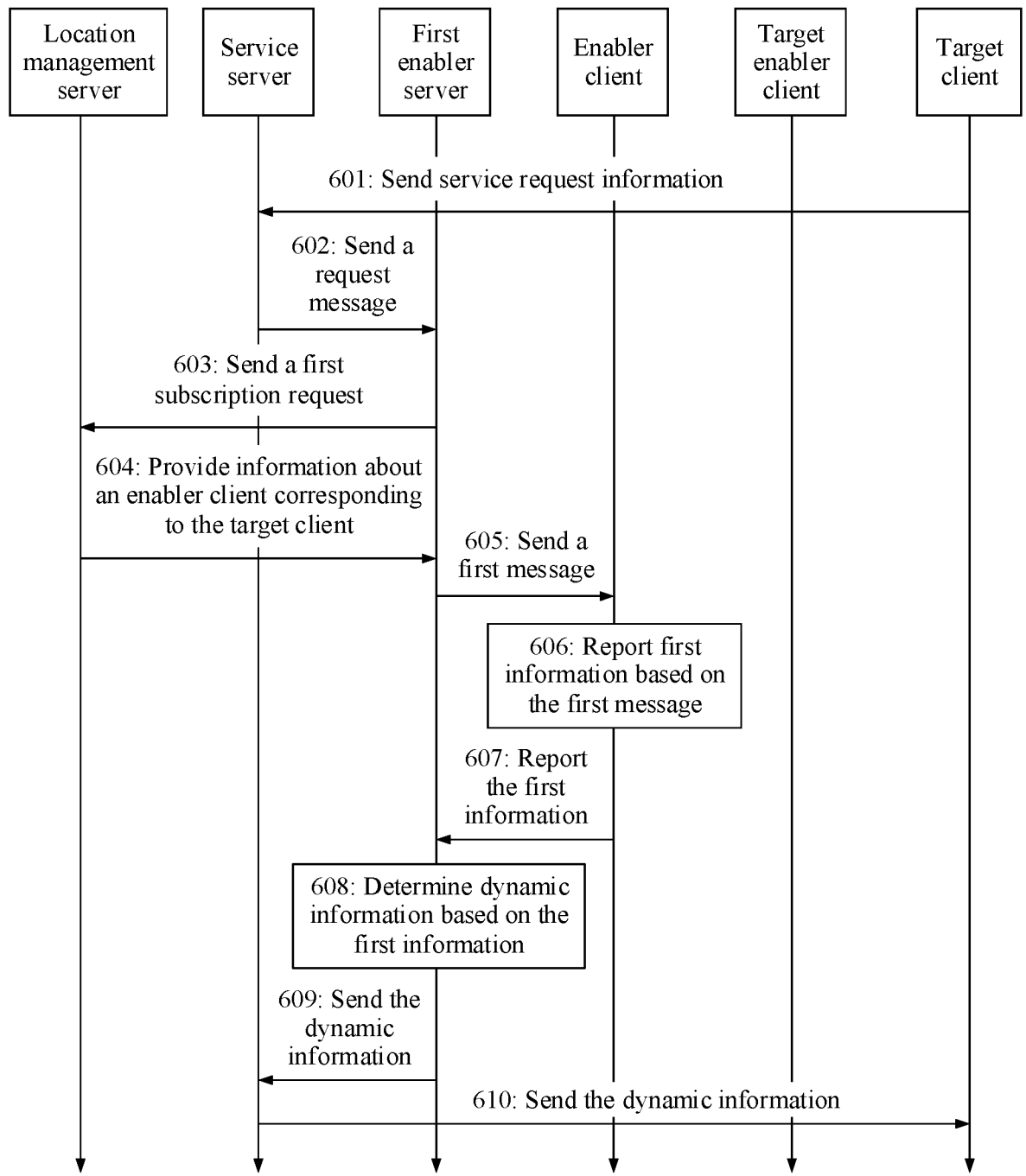
FIG. 6 is a schematic flowchart of another dynamic information obtaining method according to an embodiment of this application.

FIG. 6 is a schematic flowchart of another dynamic information obtaining method according to an embodiment of this application. As shown in FIG. 6, the method includes the following steps.

601: A target client sends service request information to a service server.

This step is optional. For example, step 601 is similar to step 501 in the embodiment shown in FIG. 5. Details are not described herein again.

602: The service server sends a request message to a first enabler server.

This step is optional. It may be understood that the service server requests a service from the first enabler server, where the request message is used to obtain dynamic information (related information of a high-definition map) associated with the target client. The request message may include an identifier of the target client and range information of the target client, or an identifier of the target client and auxiliary information of the target client.

603: The first enabler server sends a first subscription request to a location management server.

The first enabler server may send the first subscription request to the location management server, to request the location management server to track a vehicle corresponding to the target client and determine a target area corresponding to the target client. In addition, the location management server determines a plurality of enabler clients in the target area. In this way, the location management server may provide the enabler server with information about the enabler client in the target area of the target client.

604: The location management server provides the information about the enabler client corresponding to the target client for the first enabler server.

Optionally, if the first subscription request includes the identifier of the target client and the range information (which may be understood as range information of a high-definition map corresponding to the target client) corresponding to the target client, the location management server determines the target area of the target client based on the subscription request, determines the enabler client based on the target area, and sends the information about the enabler client to the first enabler server.

Optionally, if the first subscription request includes the identifier of the target client and the auxiliary information of the target client, the location management server determines, based on the auxiliary information of the target client, a range of a high-definition map corresponding to the target client. Then, the location management server tracks location coordinates of the intelligent vehicle based on the identifier of the target client, determines the target area based on the location coordinates and the range of the high-definition map, determines the enabler client in the target area, and reports the information about the enabler client to the first enabler server.

Optionally, if the first subscription request includes location information of the target client and the range information corresponding to the target client, the location management server determines the target area of the target client based on the location information of the target client and the range information corresponding to the target client in the subscription request, determines the enabler client based on the target area, and sends the information about the enabler client to the first enabler server.

605: The first enabler server sends a first message to the enabler client.

For example, step 605 is similar to step 505 in the embodiment shown in FIG. 5. Details are not described herein again.

606: The enabler client reports first information based on the first message.

For example, step 606 is similar to step 506 in the embodiment shown in FIG. 5. Details are not described herein again.

607: The enabler client reports the first information to the first enabler server.

For example, step 607 is similar to step 510 in the embodiment shown in FIG. 5. Details are not described herein again.

608: The first enabler server determines the dynamic information based on the first information.

For example, step 608 is similar to step 511 in the embodiment shown in FIG. 5. Details are not described herein again.

609: The first enabler server sends the dynamic information to the service server.

For example, step 609 is similar to step 512 in the embodiment shown in FIG. 5. Details are not described herein again.

610: The service server sends the dynamic information to the target client.

For example, step 610 is similar to step 513 in the embodiment shown in FIG. 5. Details are not described herein again.

In the technical solution provided in some embodiments, the first enabler server does not need to determine the target area corresponding to the target client, but directly subscribes to a service from the location management server, so that the location management server tracks the location coordinates of the vehicle corresponding to the target client, and then determines the target area based on the location coordinates and the range. The location management server then reports the information about the enabler client in the target area. Then, the first enabler server sends the first message to the enabler client, to indicate the enabler client to report dynamic traffic information of the enabler client, and then may obtain, based on the dynamic traffic information, the dynamic information associated with the target client, so that the target client can control, based on the dynamic information, a driving behavior of the intelligent vehicle corresponding to the target client. In this way, a workload of the first enabler server is reduced, and working performance of the first enabler server is improved.

Figure 7:
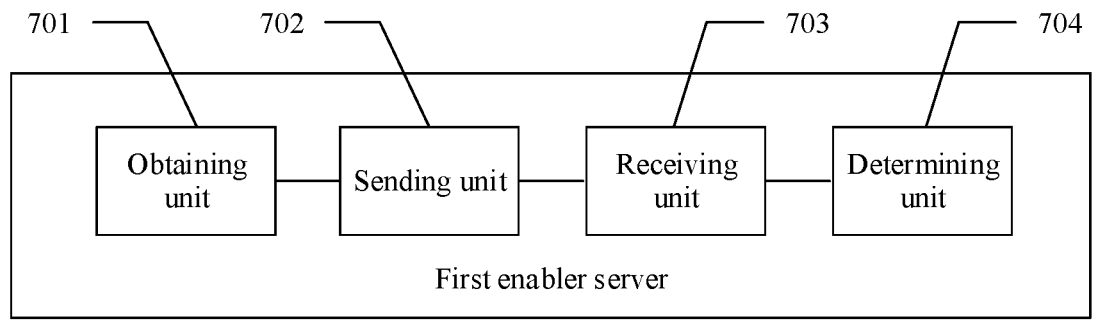
FIG. 7 is a schematic diagram of a structure of a first enabler server according to an embodiment of this application.

FIG. 7 is a schematic diagram of a structure of a first enabler server according to an embodiment of this application. The first enabler server includes an obtaining unit 701 (e.g., obtaining circuit) and a sending unit 702 (e.g., sending circuit).

The obtaining unit 701 is configured to obtain information about an enabler client in a target area of a target client.

The sending unit 702 is configured to send a first message to the enabler client, where the first message is used for the enabler client reporting first information.

The first information includes local dynamic information of the enabler client, and the first information is used for obtaining dynamic information associated with the target client.

In a possible implementation, the dynamic information associated with the target client includes first dynamic information or second dynamic information, the first dynamic information is dynamic information of a high-definition map dynamic layer of the target client, and the second dynamic information is high-definition map information of the target client.

In a possible implementation, the first enabler server further includes a receiving unit 703 (e.g., receiving circuit), where the receiving unit 703 is configured to receive information about the target area from a service server.

In a possible implementation, the first enabler server further includes a determining unit 704 (e.g., determining circuit), and the receiving unit 703 is further configured to receive an identifier of the target client and range information of the target client from a service server.

The determining unit 704 is configured to determine the target area based on the identifier of the target client and the range information.

In a possible implementation, the receiving unit 703 is further configured to receive an identifier of the target client and auxiliary information of the target client from a service server.

The determining unit 704 is further configured to determine the target area based on the identifier of the target client and the auxiliary information.

In a possible implementation, the auxiliary information includes at least one of a type of a service that the target client participates in, a sensor measurement range corresponding to the target client, capability information of a terminal device corresponding to the target client, a speed of the target client, a direction of the target client, and a planned path of the target client.

In a possible implementation, the receiving unit 703 is further configured to receive an update policy, where the update policy is used to update the dynamic information.

In a possible implementation, the sending unit 702 is further configured to send a first subscription request to a location management server, where the first subscription request includes the identifier of the target client and the range information corresponding to the target client, and the subscription request is used to subscribe to the information about the enabler client corresponding to the target client.

The receiving unit 703 is further configured to receive the information about the enabler client from the location management server.

In a possible implementation, the sending unit 702 is further configured to send a first request message to the location management server, where the first request message includes the information about the target area.

The receiving unit 703 is further configured to receive the information about the enabler client in the target area from the location management server.

In a possible implementation, the obtaining unit 701 is configured to obtain the information about the enabler client located in the target area from a second enabler server.

In a possible implementation, the first message includes a reporting policy, and the sending unit 702 is configured to send the first message to the enabler client according to the update policy, where the reporting policy is related to the update policy.

In a possible implementation, the first message indicates the enabler client to report the first information to the enabler server, and the receiving unit 703 is further configured to receive the first information, and send the dynamic information to the target client based on the first information.

In a possible implementation, the sending unit 702 is configured to send the dynamic information to the target client through the service server.

In a possible implementation, the first message indicates the enabler client to report the first information to the target client.

It should be noted that content such as information exchange and an execution process between the modules/units in the first enabler server is based on a same concept as the method embodiments corresponding to FIG. 4, FIG. 5, and FIG. 6 in this application. For specific content, refer to the descriptions in the foregoing method embodiments in this application. Details are not described herein again.

Figure 8:
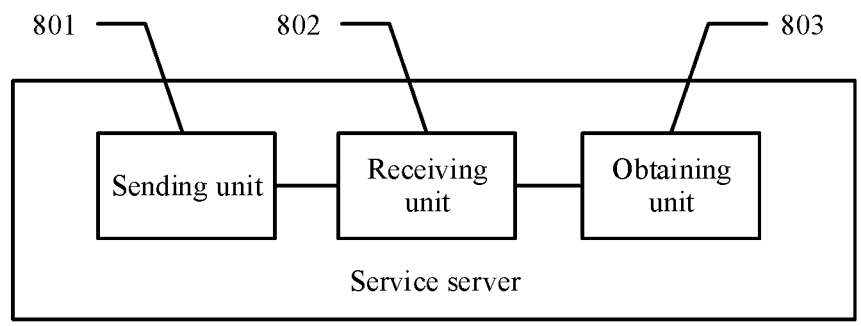
FIG. 8 is a schematic diagram of a structure of a service server according to an embodiment of this application.

FIG. 8 is a schematic diagram of a structure of a service server according to an embodiment of this application. The service server includes a sending unit 801 and a receiving unit 802.

The sending unit 801 is configured to send a request message to an enabler server, where the request message is used to obtain dynamic information associated with a target client.

The receiving unit 802 is configured to receive the dynamic information.

In a possible implementation, the dynamic information associated with the target client includes first dynamic information or second dynamic information, the first dynamic information is dynamic information of a high-definition map dynamic layer of the target client, and the second dynamic information is high-definition map information of the target client.

In a possible implementation, the request message carries at least one of the following information: information about a target area of the target client; an identifier and range information of the target client; or an identifier of the target client and auxiliary information of the target client.

In a possible implementation, the service server further includes an obtaining unit 803, and the obtaining unit 803 is configured to obtain the second dynamic information based on the first dynamic information.

In a possible implementation, the sending unit 801 is further configured to send the first dynamic information or the second dynamic information to the target client.

It should be noted that content such as information exchange and an execution process between the modules/ units in the service server is based on a same concept as the method embodiments corresponding to FIG. 4, FIG. 5, and FIG. 6 in this application. For specific content, refer to the descriptions in the foregoing method embodiments in this application. Details are not described herein again.

Figure 9:
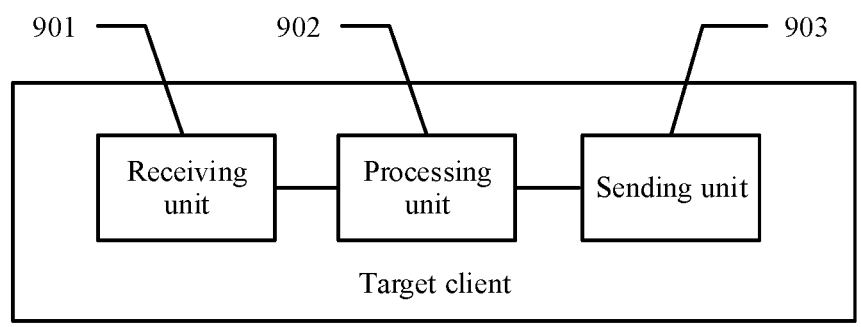
FIG. 9 is a schematic diagram of a structure of a target client according to an embodiment of this application.

FIG. 9 is a schematic diagram of a structure of a target client according to an embodiment of this application. The target client includes a receiving unit 901 and a processing unit 902.

The receiving unit 901 is configured to receive first information from an enabler client.

The processing unit 902 is configured to obtain, based on the first information, dynamic information associated with the target client, where the first information includes local dynamic information of the enabler client.

In a possible implementation, the dynamic information associated with the target client includes first dynamic information or second dynamic information, the first dynamic information is dynamic information of a high-definition map dynamic layer of the target client, and the second dynamic information is high-definition map information of the target client.

In a possible implementation, the processing unit 902 is configured to obtain the dynamic information based on the first information and second information, where the second information indicates local dynamic information of the target client.

In a possible implementation, the processing unit 902 is further configured to obtain the second dynamic information based on the first dynamic information.

In a possible implementation, the target client further includes a sending unit 903, configured to send the first dynamic information or the second dynamic information to a service client.

It should be noted that content such as information exchange and an execution process between the modules/units in the target client is based on a same concept as the method embodiments corresponding to FIG. 4, FIG. 5, and FIG. 6 in this application. For specific content, refer to the descriptions in the foregoing method embodiments in this application. Details are not described herein again.

Figure 10:
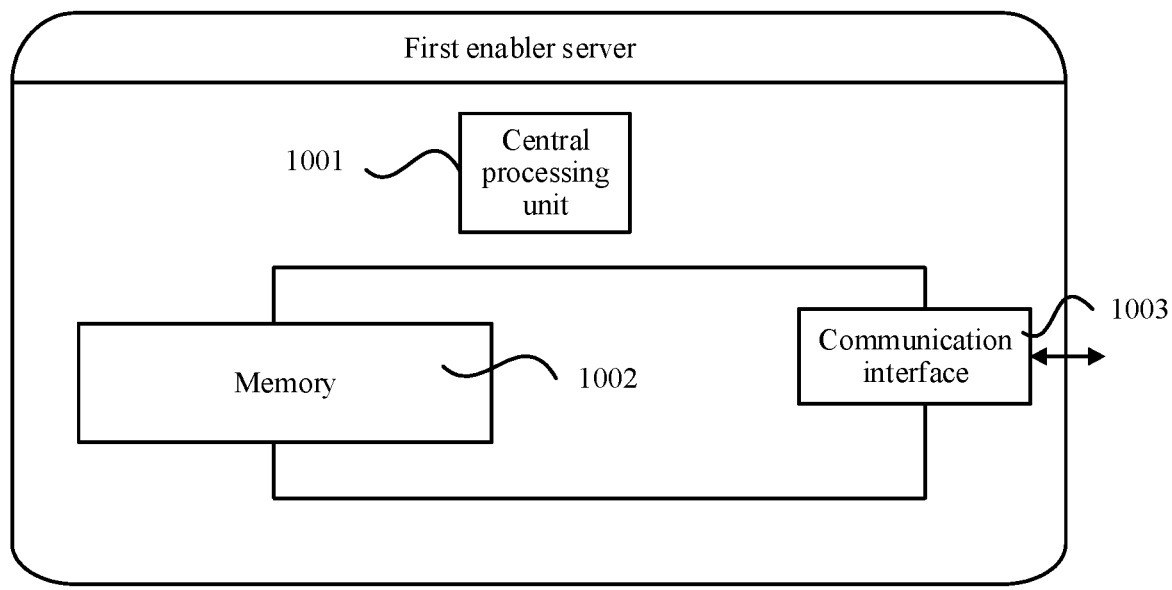
FIG. 10 is a schematic diagram of a structure of another first enabler server according to an embodiment of this application.

With reference to FIG. 10, an embodiment of a first enabler server in an embodiment of this application may include one or more central processing units 1001, a memory 1002, and a communication interface 1003.

The memory 1002 may be used for temporary storage or permanent storage. Further, the central processing unit 1001 may be configured to communicate with the memory 1002, and perform, on the first enabler server a series of instruction operations in the memory 1002.

In some embodiments, the central processing unit 1001 may perform operations performed by the first enabler server in the embodiment shown in FIG. 4, FIG. 5, or FIG. 6. Details are not described herein again.

In some embodiments, specific function module division in the central processing unit 1001 may be similar to function module division in the units such as the obtaining unit, the receiving unit, and the determining unit described in FIG. 7. Details are not described herein again.

Figure 11:
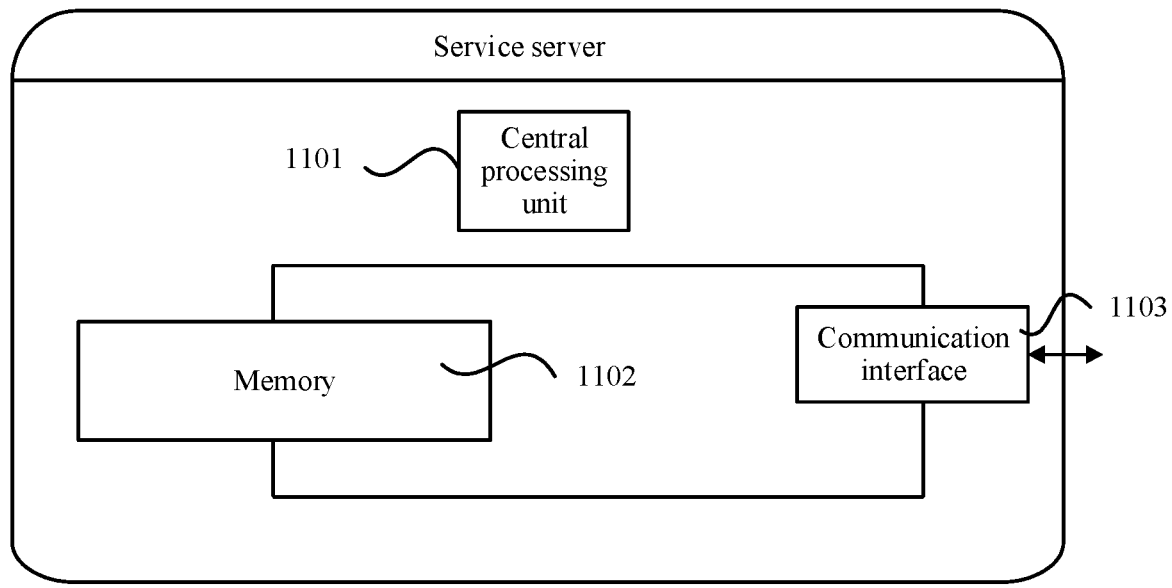
FIG. 11 is a schematic diagram of a structure of another service server according to an embodiment of this application.

With reference to FIG. 11, an embodiment of a service server in an embodiment of this application may include one or more central processing units 1101, a memory 1102, and a communication interface 1103.

The memory 1102 may be used for temporary storage or permanent storage. Further, the central processing unit 1101 may be configured to communicate with the memory 1102, and perform, on the service server a series of instruction operations in the memory 1102.

In some embodiments, the central processing unit 1101 may perform a signal processing operation performed by the service server in the embodiment shown in FIG. 4, FIG. 5, or FIG. 6. Details are not described herein again.

In some embodiments, specific function module division in the central processing unit 1101 may be similar to function module division in the units such as the sending unit, the receiving unit, and the obtaining unit described in FIG. 8. Details are not described herein again.

Figure 12:
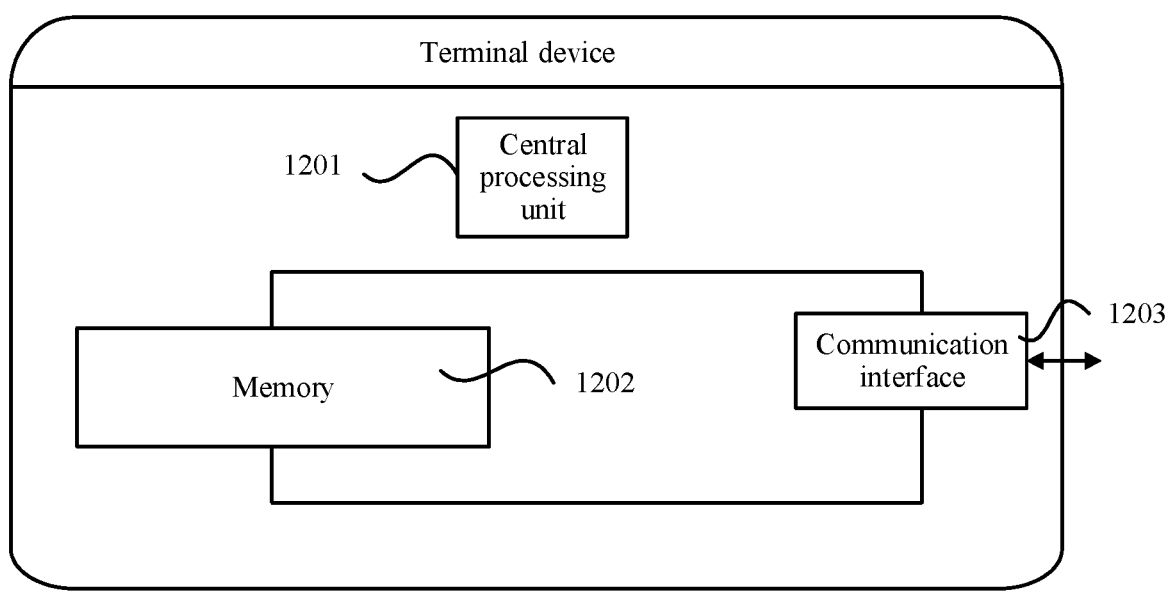
FIG. 12 is a schematic diagram of a structure of a terminal device according to an embodiment of this application.

With reference to FIG. 12, an embodiment of a terminal device in an embodiment of this application may include one or more central processing units 1201, a memory 1202, and a communication interface 1203.

The memory 1202 may be used for temporary storage or permanent storage. Further, the central processing unit 1201 may be configured to communicate with the memory 1202, and perform, on the terminal device, a series of instruction operations in the memory 1202.

In some embodiments, the central processing unit 1201 may perform operations performed by the target client in the embodiment shown in FIG. 4, FIG. 5, or FIG. 6. Details are not described herein again.

In some embodiments, specific function module division in the central processing unit 1201 may be similar to function module division in the receiving unit, the processing unit, or the sending unit described in FIG. 9. Details are not described herein again.

An embodiment of this application further provides a dynamic information obtaining system, including a first enabler server, a service server, and a terminal device. The first enabler server is the first enabler server according to any possible implementation of the embodiment shown in FIG. 7, the service server is the service server according to any possible implementation of the embodiment shown in FIG. 8, and the terminal device is the target client according to any possible implementation of the embodiment shown in FIG. 8.

An embodiment of this application further provides a chip or a chip system. The chip or the chip system includes at least one processor and a communication interface. The communication interface and the at least one processor are interconnected through a line. The at least one processor is configured to run a computer program or instructions, to perform the dynamic information obtaining method described in any one of the implementations of FIG. 4, FIG. 5, or FIG. 6.

The communication interface in the chip may be an input/output interface, a pin, a circuit, or the like.

In a possible implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

An embodiment of this application further provides a computer storage medium. The computer storage medium is configured to store computer software instructions for the first enabler server, the service server, and the target client. The computer software instructions include a program designed for the first enabler server, the service server, and the target client.

The first enabler server may be the first enabler server described in FIG. 7.

The service server may be the service server described in FIG. 8.

An embodiment of this application further provides a computer program product, where the computer program product includes computer software instructions, and the computer software instructions may be loaded by a processor to implement a procedure of any one of the dynamic information obtaining methods in FIG. 4 to FIG. 6.

All or a part of the foregoing embodiments may be implemented by software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate components may or may not be physically separate, and components displayed as units may or may not be physical units, may be located in one place, or may be distributed on a plurality of network units. A part or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware (e.g., circuitry), or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A dynamic information obtaining method, wherein the method comprises:
   obtaining, by a first server, information about a client in a target area of a target client; and
   sending, by the first server, a first message to the client, wherein the first message is used to request the client to report first information, wherein
   the first information comprises local dynamic information of the client, and the first information is used for obtaining dynamic information associated with the target client.

2. The method according to claim 1, wherein the dynamic information associated with the target client comprises high-definition map information of the target client.

3. The method according to claim 1, wherein the local dynamic information comprises information about a nearby vehicle and a nearby pedestrian.

4. The method according to claim 1, wherein the method further comprises:
   receiving, by the first server, an identifier of the target client and range information of the target client from a service server; and
   determining, by the first server, the target area based on the identifier of the target client and the range information.

5. The method according to claim 1, wherein the obtaining, by the first server, the information about the client in the target area of the target client comprises:
   sending, by the first server, a first request message to a location management server, wherein the first request message comprises information about the target area; and
   receiving, by the first server, the information about the client in the target area from the location management server.

6. The method according to claim 1, wherein the obtaining, by the first server, the information about the client in the target area of the target client comprises:
   obtaining, by the first server, the information about the client in the target area from a second server.

7. The method according to claim 1, wherein the first message indicates to the client to report the first information to the server, and the method further comprises:
   receiving, by the first server, the first information, and sending the dynamic information to the target client based on the first information.

8. The method according to claim 1, wherein the method further comprises:
receiving, by the first server, the first information; and
sending, by the first server based on the first information, the dynamic information to a service server.

9. The method according to claim 1, wherein the method further comprises:
receiving, by the first server, a second request message from a service server, wherein the second request message is used to obtain the dynamic information associated with the target client.

10. A dynamic information obtaining method, wherein the method comprises:
sending, by a service server, a request message to a server, wherein the request message is used to obtain dynamic information associated with a target client, the request message carries information about a target area of the target client, and the dynamic information comprises high-definition map information of the target client; and
receiving, by the service server, the dynamic information.

11. A server, comprising at least one processor, wherein the at least one processor is coupled to a storage medium storing executable instructions, wherein the executable instructions, when executed by the at least one processor, cause the at least one processor to:
obtain information about a client in a target area of a target client; and
send a first message to the client, wherein the first message is used for the client to report first information, wherein
the first information comprises local dynamic information of the client, and the first information is used for obtaining dynamic information associated with the target client.

12. The server according to claim 11, wherein the at least one processor is further configured to:
receive an identifier of the target client and range information of the target client from a service server; and
determine the target area based on the identifier of the target client and the range information.

13. The server according to claim 11, wherein the at least one processor is further configured to:
send a first request message to a location management server, wherein the first request message comprises the information about the target area; and
receive the information about the client in the target area from the location management server.

14. The server according to claim 11, wherein the at least one processor is further configured to:
receive the first information; and
send the dynamic information to a service server based on the first information.

15. A dynamic information obtaining system, comprising an enabler server and a service server, wherein
the service server is configured to send a second request message to the enabler server, wherein the second request message is used to obtain dynamic information associated with a target client; and
the enabler server is configured to: obtain information about an enabler client in the target area of the target client, and send a first message to the enabler client, wherein the first message is used for the enabler client to report first information, wherein the first information comprises local dynamic information of the enabler client, and the first information is used for obtaining dynamic information associated with the target client.

16. The dynamic information obtaining system according to claim 15, wherein the enabler server is further configured to:
receive the first information; and
send the dynamic information to the service server based on the first information.

17. The dynamic information obtaining system according to claim 15, further comprises a location management server, wherein
the enabler server is further configured to send a first request message to the location management server, wherein the first request message comprises the information about the target area;
the location management server is configured to receive the first request message, and send the information about the enabler client in the target area; and
the enabler server is further configured to receive the information about the enabler client in the target area.

18. The dynamic information obtaining system according to claim 15, wherein the enabler server is further configured to:
obtain the information about the enabler client in the target area from a second enabler server.

* * * * *